(12) United States Patent
O'Callahan

(10) Patent No.: US 7,840,849 B2
(45) Date of Patent: Nov. 23, 2010

(54) METHODS AND APPARATUS FOR DEBUGGING SOFTWARE INCLUDING DIVISIONS OF AN EXECUTION HISTORY OF A DEBUGGEE PROGRAM

(75) Inventor: Robert Weeks O'Callahan, Auckland (NZ)

(73) Assignee: Novell, Inc., Provo, UT (US)

( * ) Notice: Subject to any disclaimer, the term of this patent is extended or adjusted under 35 U.S.C. 154(b) by 690 days.

(21) Appl. No.: 11/643,102

(22) Filed: Dec. 21, 2006

(65) Prior Publication Data
US 2008/0155342 A1    Jun. 26, 2008

(51) Int. Cl.
*G06F 11/00* (2006.01)
*G06F 11/32* (2006.01)

(52) U.S. Cl. .............................. 714/45; 714/37; 714/38; 717/124

(58) Field of Classification Search ............... 714/37, 714/38, 45, 35; 717/124–128
See application file for complete search history.

(56) References Cited

U.S. PATENT DOCUMENTS

| | | | |
|---|---|---|---|
| 5,734,892 A * | 3/1998 | Chu ................................. 1/1 |
| 5,813,011 A * | 9/1998 | Yoshida et al. ...................... 1/1 |
| 5,938,778 A * | 8/1999 | John et al. ..................... 714/45 |
| 6,126,329 A * | 10/2000 | Bennett et al. .............. 717/127 |
| 6,219,827 B1 | 4/2001 | Man |
| 6,230,313 B1 * | 5/2001 | Callahan et al. ............. 717/128 |
| 6,678,883 B1 * | 1/2004 | Berry et al. ................. 717/128 |
| 6,715,140 B1 | 3/2004 | Haga |
| 7,024,661 B2 | 4/2006 | Leino et al. |
| 7,174,543 B2 * | 2/2007 | Schwemmlein et al. ..... 717/128 |
| 7,308,681 B2 * | 12/2007 | Ekanadham et al. ........ 717/128 |
| 7,496,902 B2 * | 2/2009 | Levine et al. ............... 717/128 |
| 7,600,221 B1 * | 10/2009 | Rangachari ................. 717/128 |
| 7,720,662 B1 * | 5/2010 | Aldrich ........................ 703/13 |
| 2006/0225050 A1 * | 10/2006 | Thekkath ..................... 717/128 |

OTHER PUBLICATIONS

"CICS," Wikipedia, web-site print-out, 2006, 4 pps.
"Valgrind," Valgrind, web-site print-out, 2006, 7 pps.
"Omniscient Debugging 'Because the Debubber Knows Everything,'" LambdaCS, web-site print-out, Apr. 21, 2005, 2 pps.
Craig Anslow, Stuart Marshall, Robert Biddle, James Noble, Kirk Jackson, "XML Database Support for Program Trace Visualisation," Australian Computer Society, Inc.

(Continued)

*Primary Examiner*—Scott T Baderman
*Assistant Examiner*—Joseph Schell
(74) *Attorney, Agent, or Firm*—King & Schickli, PLLC

(57) ABSTRACT

In a computing system environment, methods and architecture relate to debugging software programs. The programs, regardless of size, are culled for substantially all memory and register writes (and flow control). An indexing and compression occurs so that upon a later query, and decompression (and display), a user can find and diagnose defects in the software program. To efficiently reconstruct the contents of any memory location or register, backwards tracing of events is comprehensively known for all time, not just select periods. Efficiencies in the indexing function include bunching, replacing actual memory locations with pattern(s) representative of same and dividing an execution history of the software program into manageable sections. Nuances for memory or register effects are also contemplated. Still other embodiments contemplate stand-alone computer program products (on computer-readable media or as a download, or other) or those working in conjunction with other debugging programs.

18 Claims, 11 Drawing Sheets

OTHER PUBLICATIONS

2004, Australian Symposium on Information Visualisation, Christchurch, Conferences in Research and Practice in Information Technology, vol. 35, pp. 25-34.

"Using and Understanding the Valgrind Core," Valgrind, web-site print-out, 35 pps.

"Valgrind," Wikipedia, web-site print-out, 2006, 3 pps.

* cited by examiner

FIG. 3

METHODS AND APPARATUS FOR DEBUGGING SOFTWARE INCLUDING DIVISIONS OF AN EXECUTION HISTORY OF A DEBUGGEE PROGRAM

FIELD OF THE INVENTION

Generally, the present invention relates to computing system environments involved in debugging software. Particularly, it relates to omniscient debugging of software, regardless of program size, including tracking or recording all memory and register writes and indexing same to efficiently reconstruct the contents of any memory location or register at any or all periods of time. In this manner, debugging is greatly enhanced. Backwards tracing of events is comprehensively available for all time, not just select periods. Various features relate to efficiencies in the indexing function as well as compression. Stand-alone computer program products or those working in conjunction with other debuggers are also considered as is convenient displaying of information to users. Supporting user queries regarding timing of a last modification of memory or register locations before some other specified time is another noteworthy feature, as is supporting recording and querying of the execution of instructions at various memory locations.

BACKGROUND OF THE INVENTION

Debugging of software programs is fundamentally about tracing effects back to their causes. However, traditional debuggers merely monitor a program's forward execution and are not well suited to the debugging task. Debugging also requires information about the program state(s) in the past. Saving all programming history is such an overwhelming task that so much recording of the past is discarded, often in a FIFO format. Upon discarding, a trace to the past, and often the key to diagnosing a defect, is lost forever thereby decreasing chances of debugging success. Altogether, there exists no technology today that provides a debugger with the following desirable properties:

1. Comprehensive recording. The capture of enough information from a single run of the debuggee program that nearly every detail of the program state during the run can be reconstructed without having to run the program again. In turn, this allows one to hoist "run the program" out of the loop of a programmer's debugging activity. Comprehensiveness is also desirable in that it aids debugging of non-deterministic programs such that, once a bug has manifested itself once, users can diagnose it and permanently eliminate its root cause.

2. Efficient state reconstruction. The ability of a debugger to reconstruct program states at any point in time with a cost proportional to the amount of states reconstructed, but independent of any actual time point chosen. In the prior art, this was problematic for replay-based techniques, which tended to have a cost proportional to the differences in time points of interest.

3. Efficient reverse dataflow. As is known, a fundamental debugging analysis includes determining when and where was a wrong value X at time T set. It is then desirable to efficiently analyze this, but at a cost independent of the difference in time between T and when X was set.

4. Additional queries. The ability of a debugger to efficiently answer questions other than traditional inquiries posed above, such as "when was the last execution of program point P (before time T)."

5. Practicality. The ability of a debugger to find usability with as many programmers as possible. For this, it should then have ability to run on PC-class hardware, supporting standard operating systems, languages, and runtime systems, etc. It should also be able to handle large complex programs, since many of the hardest debugging problems exist in the larger, more popular programs readily accessible to hackers.

6. Reasonable overhead. The ability of a debugger to record the past (so that users can find and diagnose bugs) with minimal expense of space and time requirements for recording. It should also avoid exhausting the user's hardware or patience. To the extent automated testing is available for recording the past, it should be able to run unattended.

To this end, the prior art fails and needs presently exist to meet all or most of the above-requirements. Naturally, any improvements should further contemplate good engineering practices, such as relative inexpensiveness, stability, ease of implementation, low complexity, etc.

SUMMARY OF THE INVENTION

The above-mentioned and other problems become solved by applying the principles and teachings associated with the hereinafter-described methods and apparatus for debugging software programs. At a high level, facilitating omniscient or comprehensive debugging of C and C++ programs, for example, needs a collection of traces to the past for every memory and register write performed by a process and an index, of sorts, that permits the efficient reconstruction of the contents of any given memory location or register at any point in time during the execution. In this regard, features of the invention generate traces by instrumenting program machine code using, the well known debugging program, Valgrind. The instrumentation code sends event data to a helper process that indexes the events, compresses the events and indexes, and writes them to a log file. It has even been fairly successfully tested to debug the Firefox web browser, which is written as a mixture of C, C++, Javascript and assembly language and which executes more than three billion instructions to start up and display a simple Web page (in a debug build).

At a more detailed level, the software programs under consideration (debuggee programs) are culled for substantially all memory and register writes (and flow control), regardless of the size of the program. An indexing function and compression occurs so that upon a later query, and decompression (and display), a user can find and diagnose defects in the software program. To efficiently reconstruct the contents of any memory location or register, backwards tracing of events is comprehensively known for all time, not just select periods. Efficiencies or optimizations in the indexing function include bunching, replacing actual memory locations with pattern(s) representative of same and dividing an execution history of the software program into manageable sections. Nuances for memory or register effects are also contemplated. Still other embodiments contemplate stand-alone computer program products (on computer-readable media or as a download, or other) or those working in conjunction with other debugging programs.

In a representative embodiment, a custom instrumentation module, together with an existing binary instrumentation tool, e.g., Valgrind, inserts code into a to-be-debugged program to record the program's register writes, memory writes, and instruction executions on-the-fly and send them to a helper process via a shared memory channel. The helper process indexes the events, compresses the events and indexes, and writes the results to the log file in such a way that the file is emitted as one long sequential write (to maximize disk write bandwidth). Thereafter, the log is read by a query processing tool. It uses the reverse strategy used by the indexer/compressor.

Particular optimizations include a technique referred to as "bunching." That is, many software program code blocks are executed frequently and generate many memory effects of the same type (e.g., many memory writes, many instruction executions, etc.). Taken together, these effects often cover a contiguous range of memory addresses. Detection, therefore, can alter or pack such related effects into a single event, or a "bunch." The generation, communication, indexing and compression of events preferably then operates in terms of these bunches, which is more efficient than working with individual effects. In a representative embodiment, as many as eight individual memory operations can be packed into a bunch, such as eight (offset, length) pairs, in order of execution, each describing an individual memory operation, such that operations do not overlap and the union of the intervals is a single contiguous interval.

As another optimization (for register writes), a program's execution history is divided into epochs. At the beginning of each epoch, the contents of all registers are recorded. Over time, if a register R is modified, the type of instruction that is modifying R is considered. If R is being set to some constant, or R is being set to some simple arithmetic function of other registers or constants, then the value of R need not be stored, because later it will be able to be deduced from the values of other registers. Otherwise, the new or present value of R is stored. However, instead of recording the new value directly, an optimization is realized by storing only the difference between the new value of R and the value previously assigned to R by the last execution of this instruction in this epoch, if any. In this manner, as will become apparent, this helps in compression of the register value log. In other words, the end result of the register strategy is that register operations and values can be reconstructed over any time interval by selecting the relevant epoch(s), loading the register values for the start of the epoch, and then "playing forward" the list of register changes with any necessary recorded register values.

As a still other optimization, a memory is divided into pages (64K each in the current embodiment) and a history per each page is recorded. As for registers, the history of a page is divided into epochs. For each epoch, a bitmap is recorded indicating which locations within the page were modified during the epoch. A list is also kept of the bunches of writes that happened to the page during the epoch, and the data written by the bunches. Operating system activity, such as I/O and memory-map changes, are also recorded and stored for each page. In this manner, it is possible to reconstruct the contents of a memory location at any time by selecting the relevant epoch and page, and walking backwards through the write list (if necessary looking at earlier epochs) to find the last write to the location. The bitmap can then be used to skip epochs that are known to avoid alterations. The data for each register and memory epoch is compressed as a single chunk, using the off-the-shelf zlib library. The compressibility optimizations noted above give a large improvement in compression ratio obtained by zlib.

As a representative scope, a debugging method of a software program includes: obtaining a debuggee program and recording all instructions executed in the debuggee program as well as determining all memory and register writes in the debuggee program regardless of when each write occurred; indexing the writes and compressing same; and querying the compressed index by a user during the debug process which results in a decompressed index, for display, that a user can find and diagnose defects in the debuggee program, including displaying of a time-ordered result of the all memory and register writes.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 2 and 3 are screen shots in accordance with the present invention of representative displays of arranged debugging data in a prototype debugger;

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for debugging software programs are hereinafter described.

Figure 1:
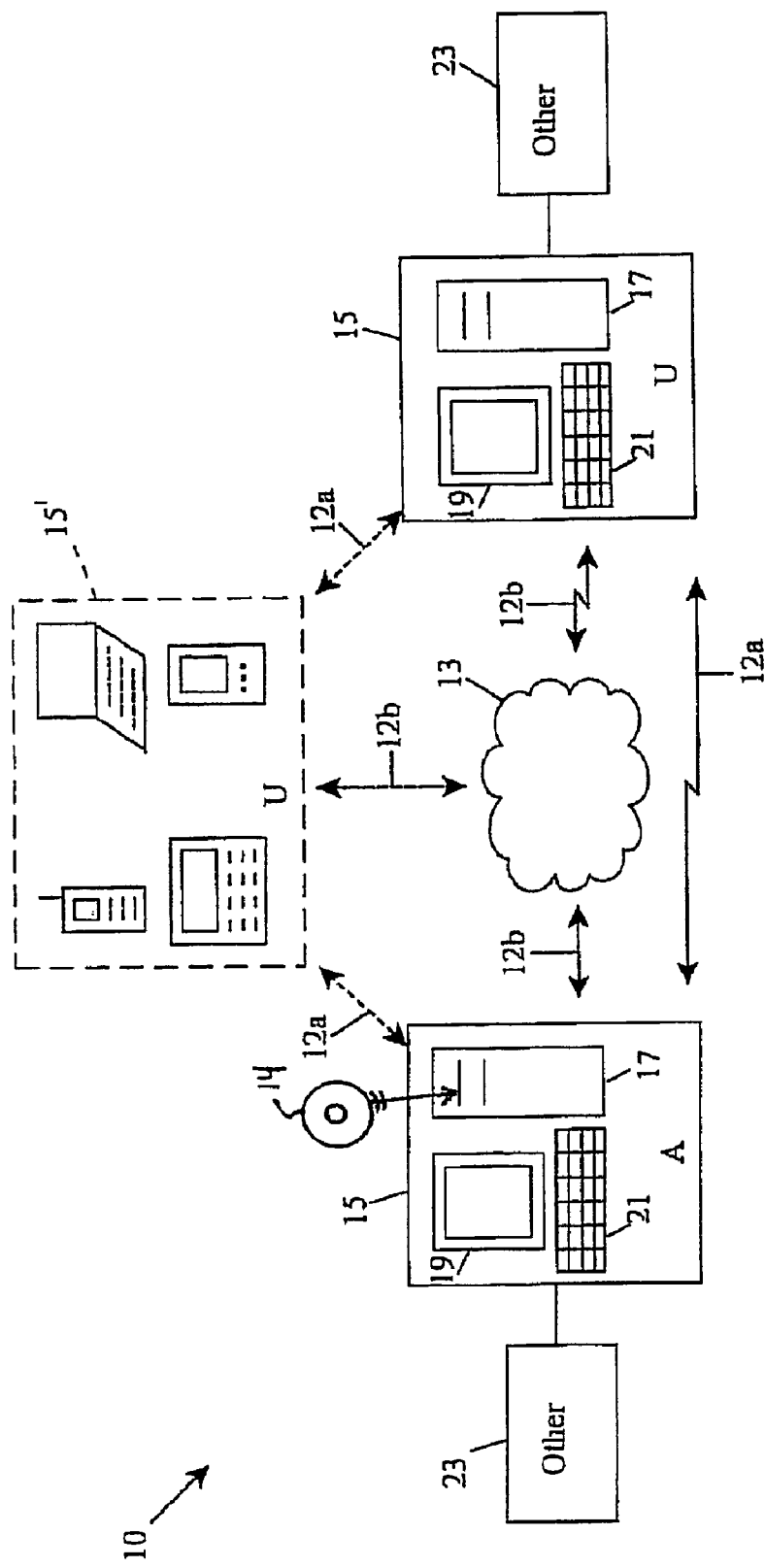
FIG. 1 is a diagrammatic view in accordance with the present invention of a representative computing system environment for debugging software programs.

With reference to FIG. 1, a representative environment 10 for debugging software includes one or more computing devices 15 available to users per each of the software programs to-be-debugged (debuggee programs) and the software program(s) for undertaking the debugging (debugger program(s)). In a traditional sense, an exemplary computing device exemplifies a stand alone server 17, such as grid or blade server. Alternatively, an exemplary computing device includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX and LINUX, to name a few, a memory, and a bus that couples various internal and external units, e.g., other 23, to one another. Representative other items 23 (also available per each of the debuggee and debugger programs) include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, a palm device, etc. The other items may also be stand alone computing devices 15' in the environment 10.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of databases, memory or computer executable instructions, e.g., software, software programs, program products, etc., as part of computer readable media, e.g., disk 14 for insertion in a drive of computer 17. Computer executable instructions may also reside in hardware, firmware or combinations in any or all of the depicted devices 15 or 15'.

When described in the context of computer or software program products, it is denoted that items thereof, such as modules, routines, programs, objects, components, data structures, etc., perform particular tasks or implement particular abstract data types within various structures of the computing system which cause a certain function or group of functions. In form, they can be any available media, such as RAM, ROM, EEPROM, CD-ROM, DVD, or other optical disk storage devices, magnetic disk storage devices, floppy disks, or any other medium which can be used to store the items thereof and which can be assessed in the environment. They can even typify downloads from other computing devices or other known or hereafter-invented forms.

In a network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
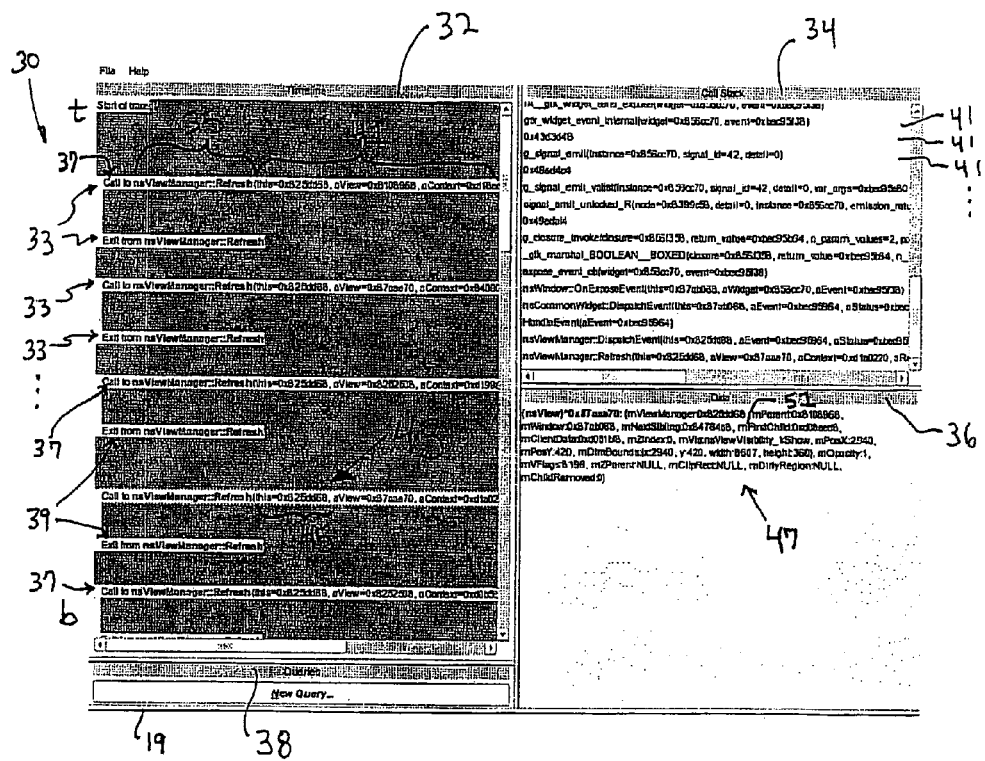
Figure 3:
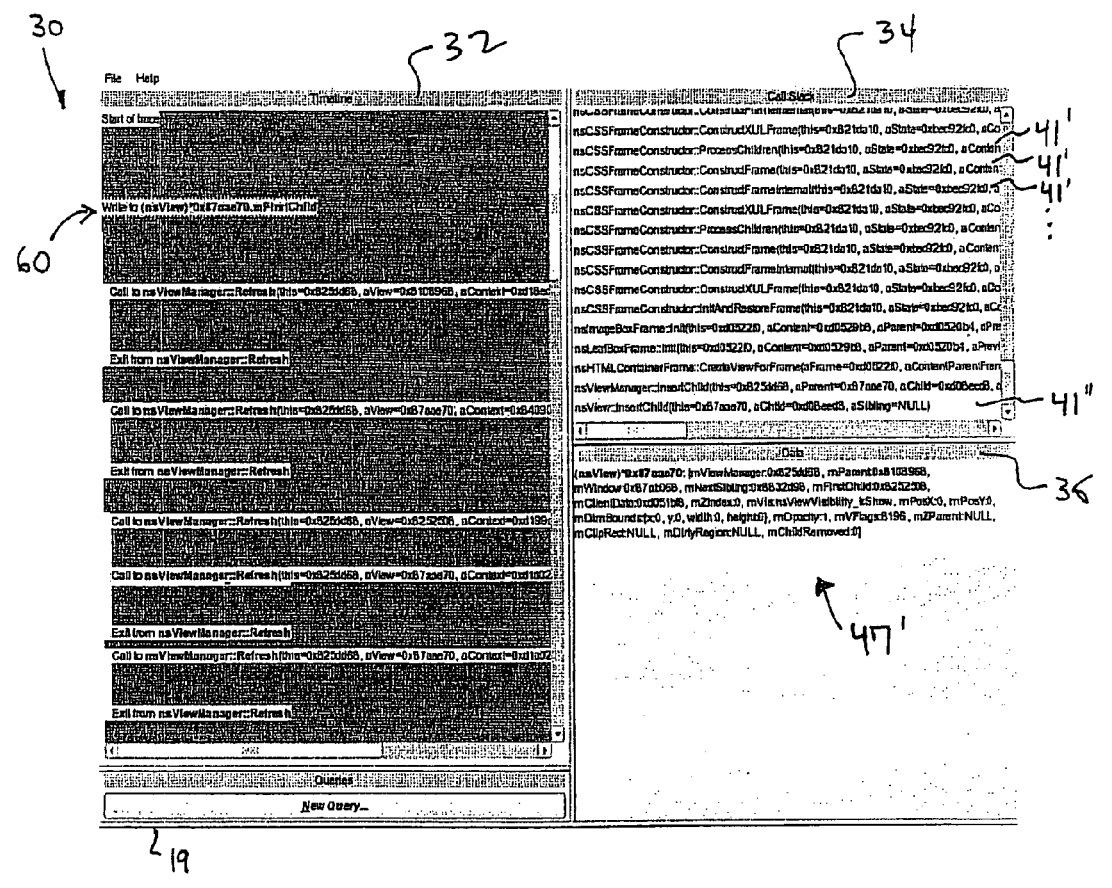

With reference to FIGS. 2 and 3, skilled artisans will appreciate that the full exploitation of the invention has many possibilities. Thus, representative screen shots 30 for display to a user on a monitor 19 of a computing device (from a prototype debugger program) is shown that illustrates a few of the many possibilities and indicates various inventive motivations that are conformable to other possibilities, not shown. Particularly, FIG. 2 shows a screen shot divided into four display panes 32, 34, 36, 38. In the primary pane, 32, a time line of events 33 (Timeline) is found showing events in the debuggee program execution history with time increasing from top (t) to bottom (b). In the example, the user or programmer has run the debuggee program to completion while saving a complete record, then launched the debugger program. The programmer then created a query from pane 38 to populate the Timeline with all invocations of a representative method given as nsViewManager::Refresh, element 35. In turn, each invocation comprises a Call event 37 and an Exit event 39, with the interval between the events being displayed as a bar. Calls are detected, in general, with a query to find all executions of the first instruction of nsViewManager::Refresh; this query returns a set of timestamps (in hereafter usage, a timestamp is simply defined as the count of instructions retired since some earlier point in time, such as the start of the program or an epoch, later defined, or the like), each corresponding to a Call event. In each Call event, parameter values 41 are also displayed at the time of the call, using register and memory values reconstructed by the debugger process for the associated timestamp. (In this case, the interpretation of register and memory values is specified by DWARF2 debug information produced by a gcc compiler and consumed by the prototype debugger.)

Continuing with the representative example, the user has selected (such as by double-clicking with a pointing device, such as a mouse) one particular invocation 43 of nsViewManager::Refresh. In so doing, the debugger program or architecture has computed the call stack in pane 34 for that timestamp. Each line 41 in the Call Stack pane 34 displays one stack frame, along with the parameter values for the call that created the stack frame, evaluated at the time of that call. (In contrast, traditional debuggers simply attempted to display parameter values for all active stack frames, but only had access to the current contents of stack memory, not past contents, and therefore may have displayed misleading values, especially if the stack locations holding parameters had been modified after subroutine entry.) The user has also selected or double-clicked on the "this" parameter 45 to nsViewManager::Refresh to inspect that object 47 in the Data pane 36. For the actual display, the debugger program has reconstructed the object's field values at the selected timestamp as is seen in the Data pane 36.

Next, suppose the value of object or field "mFirstChild," element 51 looks suspicious to the programmer in the context of finding bugs in the debuggee program. The user then selects or control-clicks on the mFirstChild—a command to locate the previous write to that field. As a result, the debugger program issues a single query and receives the timestamp of that last write. This is then inserted as a new, time-ordered event 60 in the display of the Timeline, pane 32, as shown in FIG. 3, and selected by the user as the current timestamp in order to debug. In response, the Call Stack pane 34 updates to show the lines 41' of the call stack at the earlier time, e.g., the time of the Write to (nsView) . . . mFirstChild 60, and the Data pane 36 updates to show the object or field values 47' for the selected object at the time. Ultimately, if the write indeed did set an incorrect value for the mFirstChild, skilled artisans will be able to quickly see (in the data pane of values 47' and/or call stack line 41"), find and diagnose when and why. Corrective action in the debuggee program can then take place to fix the posed, hypothetical problem. Of course, other examples are possible as will become apparent below.

Figure 4:
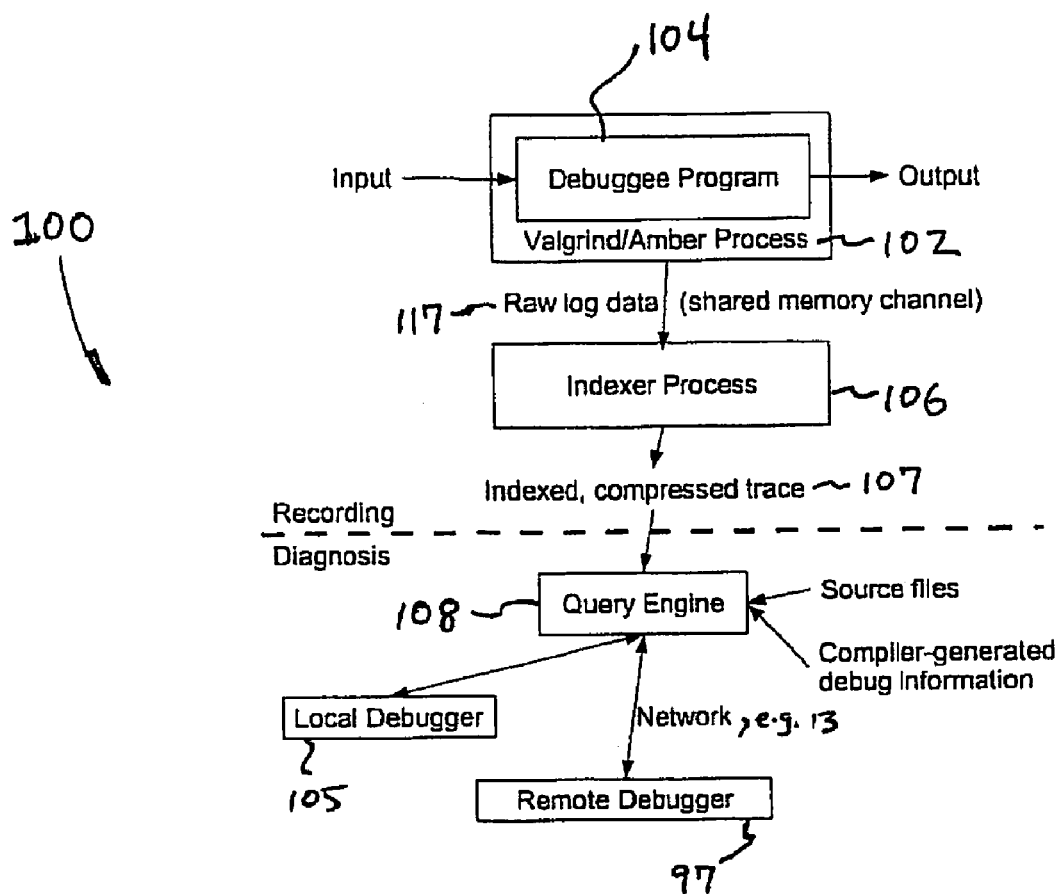
FIG. 4 is an architecture in a computing environment in accordance with the present invention for debugging software programs.

With reference to FIG. 4, the architecture enabling or permitting the foregoing example is generally given as 100. Preliminarily, however, the invention shows a division (dashed line) between recording and diagnosis. In the former, recording is that portion of the overall debugging process that determines which portions of the execution history of the debuggee program are needed to find bugs, to actually obtain or extract those portions and to arrange them, including indexing and compression. In the latter, diagnosis is that which the takes or uses the extracted and arranged information to find bugs and correct defects in the debuggee program. In this regard, much of the following discussion will be bifurcated along either the recording or diagnosis phase of the analysis.

The invention also shows a Valgrind/Amber process 102 that typifies an exchange, of sorts, between an already available, but limited, debugging program Valgrind and new code (representatively called "Amber") interfacing with Valgrind to extract information necessary from the debuggee program 104. That is, Amber uses Valgrind to instrument a Linux process at the binary level and log every memory and register write and all control flow. Alternatively, the Valgrind/Amber process is replaced by code in a single, comprehensive computer program product, not two, for purposes of extracting and logging all (or substantially all) memory and register writes and all control flow. In the former embodiment, Amber is select code that exchanges with Valgrind to extract the writes and control flow. In the latter, the single computer program product obtains the necessary information without an exchange to another program. Hereafter, terminology of either embodiment may be replaced with terminology of the other. In other words, the invention is only so limited if expressly claimed as an Amber-stylized process in relation to another debugging program or as a single program process independent of another debugging program.

In either, the log is indexed by indexer process 106 to provide efficient support for the desired queries, and compressed to reduce storage requirements and especially to avoid the bottleneck of limited disk write bandwidth. During the diagnosis phase (beneath the dashed line), a debugger 105 or 97 passes queries to a query engine 108 which answers them from the log data. As presently configured, the Amber process has been seen to exceed almost all previous debugging systems or processes in the intensity of its logging for the sake of efficient program state reconstruction and query processing. Namely, it is attempted herein to record every or nearly every memory and register write and manage the torrent of data that such produces. Nothing in the prior art has ever so boldly attempted the comprehensiveness of the instant invention.

In overall flow, FIG. 5 teaches a process 110 as follows. At step 112, the debuggee program [104] is provided or obtained for being debugged. It can exist on a common computing device with the code of the debugging software program or on a remote computing device. Regardless of form, the instructions executed in a single run or pass of the debuggee program are recorded at step 114. From there, all or nearly all the memory and register writes are recorded or stored, regardless of when having occurred. Compared to the prior art, here the magnitude of memory and register writes greatly exceeds anything attempted before. That is, each and every write is recorded for posterity so that upon later reconstruction of events, a comprehensive or an entire timeline will reveal bugs for diagnosis in the debuggee program. Although less preferred, skilled artisans will appreciate that slightly less than all the writes can be recorded and still reveal a substantial improvement over the prior art, where very little in the prior art was recorded and much was discarded. Again, the mechanism for this extraction and recording of writes and control flow stems from the Valgrind/Amber process 102, FIG. 4 or a single program product wrapped about or interfaced with the debuggee program.

Once recorded, an indexing function for the writes and control flow occurs at step 118. In FIG. 4, this is seen as the raw log data 117, in shared memory channel, being forwarded to an indexer process 106. The indexer process generates an index which, as its name implies, is a pointer, of sorts, that shows the way to particular writes or control flow of interest upon later query from a user. It also helps to arrange or order the information recorded in previous steps by the Valgrind/Amber process or by the single program product.

At step 120, compression then occurs. As will be seen below, many optimizations or efficiencies are introduced here. As imaginable, the recording of nearly every memory and register write, and control flow, in a debuggee program creates voluminous data needing to be managed practically. In this regard, compression removes redundancies in the data for easy storage and implementation on common computing devices readily available in the public domain.

At step 122, a log exists that becomes parsed to find and diagnose bugs in the debuggee program upon receipt of one or more queries at step 124, especially by way of the query engine 108, FIG. 4. Of course, display to a user at step 126 (e.g., FIGS. 2 and 3) is a practical methodology whereby users can easily undertake diagnosis of the debuggee program in computing environments.

Figure 5:
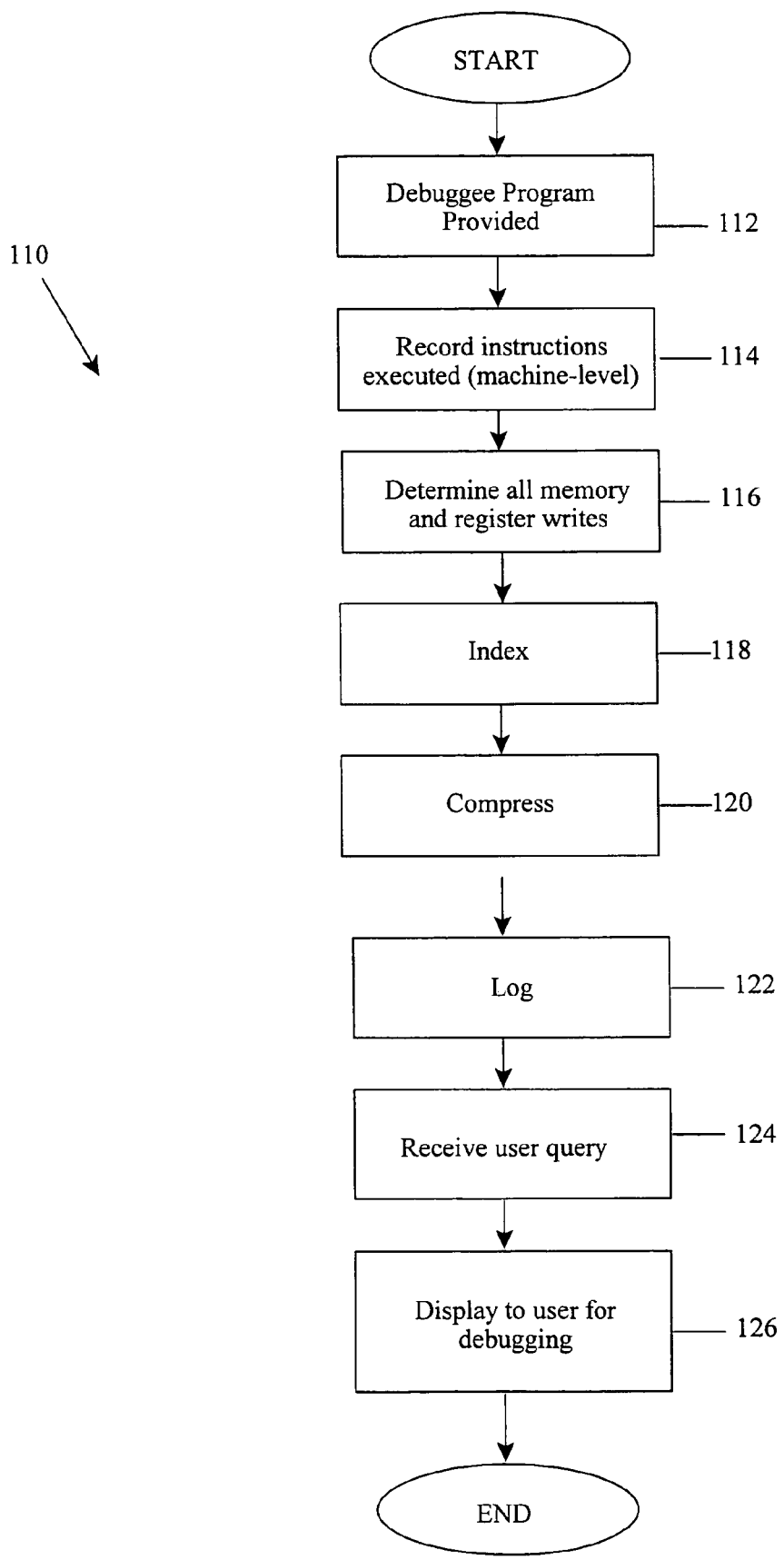
FIG. 5 is a flow chart in accordance with the present invention of a representative method for debugging software programs.

At a more particular level of implementation, such as in FIGS. 4 and 5, Valgrind is fairly recognized as an open source dynamic binary instrumentation engine, similar to products known as DynamoRio or PIN. In general, it simulates a user-level Linux process at the machine-code level by translating extended basic blocks (EBBs) of instructions on-the-fly to an internal representation (IR), and then recompiling the IR to native instructions for execution. Pluggable "tools" are permitted to modify the IR before recompilation, to introduce instrumentation. This IR rewriting approach can be cumbersome for sparse instrumentation but it is well suited to Amber's need for pervasive instrumentation.

Valgrind also provides additional capabilities that are useful to Amber. Namely, it notifies tools of the memory read and write effects of all system calls (introduced to facilitate writing Purify-like memory checkers). Amber then records the write effects of system calls in its log. Valgrind can also notify tools when memory changes due to subtle effects such as implicit growth of the stack virtual memory area, or the construction of a stack frame for signal delivery. Valgrind runs all program code on a single underlying thread and simulates operating system threads for multithreaded programs. This suits Amber, because single-threaded execution is much easier to record. (And as is seen below, Amber can exploit multiple CPUs in other ways.) Most conveniently, Valgrind is robust at handling the intricacies of instruction sets and Linux kernel semantics.

In output, such as at the raw log data 117, FIG. 4, Amber's instrumentation outputs a series of trace records from the debuggee program to the indexer and compression engine running in another process, described below. A sequence of records are stored in a shared memory buffer and the processes synchronize only when switching buffers. Among the many types of records contemplated for the memory and register writes, and flow control, the following are presented by way of example and not limitation. For example:

INIT. E.g., initialization. This is always the first record and indicates the beginning of the recording process.

SET_ADDR_MAP. This is a record emitted when the address space of the process changes, e.g. due to an mmap system call. Amber emits a series of these after INIT to record the initial address space configuration. The record describes the address space region and its new mapping (if any).

BULK_WRITE. This is a record emitted when a large amount of memory is written atomically, typically due to an I/O system call, but also in conjunction with SET_ADDR_MAP when data has been mapped into an address space. For this, the address range and data written are recorded. When read-only files are mapped, Amber skips issuing a BULK_WRITE, assuming that the file contents will be available to the eventual debugger. This avoids having to write the contents of all executables into the log.

SYSTEM_WRITE. This is a record emitted when a system call writes memory as a side effect. For this, the address range is recorded. Also, one or more BULK_WRITE records follow with the actual data. (Data is separated into multiple BULK_WRITEs because a representative implementation of the invention limits the size of a record to the size of the shared memory channel buffer.)

RESET_STATE. This is a record emitted periodically that contains the contents of all registers. Certain pseudo-registers are also included (see below). Amber also emits one of these records at startup, and whenever registers are changed by a thread context switch.

DEFINE_CODE. This is a record emitted after Amber has instrumented an EBB. The record also contains a unique identifier (ID) assigned to the block, and describes what is statically known about the memory and register effects of the block. Static information, vice dynamic, is that which occurs without change. E.g., if code of the debuggee program continually sets a register to a value of zero, which is common, it is static information and there is no need to continually record or track this thereby saving on processing time, memory space and compression time, for example.

EXEC. This is a record emitted from an instrumented EBB every time it is executed. Among other things, the record includes the block ID, from which the indexer process locates the block's static descriptor. Any dynamic information about the block's effects needed by the indexer (e.g., the address of a memory write, if not statically known) is also included in the EXEC record. The exact format of each EXEC record is tailored to the block, but can be reconstructed given the block static descriptor.

As is known in the art, Valgrind's extended basic blocks (EBBs) are single-entry, multiple-exit instruction sequences connected by fall-through or direct control transfers. Valgrind can select overlapping EBBs, but this is irrelevant to Amber. One of the key items of dynamic information in each EXEC record is the number of instructions retired, which can be less than the total number of instructions due to a unexpected conditional branch or an exception. Also, Valgrind does not allow instrumentation to take control or easily detect when an exception occurs, so it is impossible to set the instructions-retired counter when an exception causes early termination of an EBB. (Often an exception will simply set up an activation record and transfer control to a signal handler registered by the debugee program.) Therefore an instrumented EBB allocates its EXEC record on entry, fills in the dynamic effect information as the associated instructions execute, and updates the retired-instructions counter after each instruction completes. For EBBs that can terminate early, the instrumentation zeroes out the EXEC record after allocation so that upon early termination, any unused log entries are zero; the indexer process would otherwise cause compression of this data and garbage would impair or hurt otherwise good compressor performance.

In FIG. 4, at element 117, it is preferred to use a pair of shared memory buffers to communicate between the Valgrind/Amber instrumentation process and the created indexer process 106. In this regard, the instrumentation fills one shared memory buffer with records while the indexer processes records from the other buffer. The processes use a pipe to signal each other that a buffer has been filled or emptied. In so doing, the indexer process automatically processes the last incompletely filled buffer when it detects the instrumented process has terminated. (This is particularly useful for debugging Amber because it means when an error in the instrumentation (or Valgrind itself) causes a crash, a complete record right up to the point before the crash is still obtainable.) In alternate embodiments, other arrangements of memory buffers are possible and skilled artisans can envision their design without undue experimentation.

Appreciating that both memory and register writes are recorded, a bifurcated analysis occurs per either the memory or register writes. For the register, the following is submitted. Namely, the Amber instrumentation engine extracts from the Valgrind IR a static list of all register modifications performed by each program instruction (including instructions such as system calls that may indirectly change many registers). In turn, each modification is assigned one of the four following classes. (Skilled artisans will appreciate this facilitates compression by eliminating the complete storage and compression of all data. In other words, redundancy and commonality, or items inferential there from, are looked for so that larger expressions can be replaced with littler expressions and compression improved). In the classes:

1. DYNREG_WRITE. Whereby low bits of some register are set to some value. Because neither the register nor the value are statically known, both are recorded by the instrumentation.

2. REG_WRITE. Whereby low bits of a statically known register are set to some value that will be recorded dynamically by the instrumentation.

3. REG_SETCONST. Whereby low bits of a statically known register are set to a statically known value that is expressible as a signed 16-bit value.

4. REG_ADDCONST. Whereby low bits of a statically known register are set to the low bits of some (possibly other) statically known register plus some statically known value expressible as a signed 8-bit value.

Also, each of these classes comes in variations specifying the number of bits affected, e.g., 8, 16, 32, 64 or 128.

As an observation of usage: DYNREG_WRITE is the most general class but requires the most information to be recorded dynamically. Because it is preferred to have classes that require less information to be recorded dynamically, especially REG_SETCONST and REG_ADDCONST, which require no information to be recorded dynamically, one embodiment of the invention contemplates DYNREG_WRITE as actually only requiring by x87 floating point operations, whereby Valgrind treats the x87 floating point stack as a register array indexed by a hypothetical "FPTOP" register. The amount of data then that must be dynamically recorded can be reduced by extending the above classes. For example, by adding REG_MULCONST to multiply a register by a constant or REG_ADD to add two registers, further reductions in the amount of recorded data is obtained. Also, actual machine instructions could be re-executed (assuming they do not read memory or hide processor states and have no other side effects).

From here, the instrumentation engine 102, FIG. 4 transmits the static register modification list to the indexer process in each DEFINE_CODE record. Then, each time an EBB is executed, for each executed register modification, the instrumentation logs any necessary dynamic values (and possibly register numbers) and includes this log as part of the payload to the EXEC record.

Ultimately, static and dynamic information is usable to reconstruct the contents of all registers at any point in time by replaying register modifications, given the initial states of registers, which are known from RESET_STATE records. As before, RESET_STATE records are emitted periodically to ensure that reconstruction costs are bounded. Along with the normal architected registers, RESET_STATE records also contain a "thread" pseudo-register recording the current kernel thread ID. In this regard, Valgrind notifies Amber whenever a thread switch occurs, and Amber immediately outputs a new RESET_STATE record with the new thread ID and register values.

For the memory effects, vice register effects above, the following is submitted. Namely, Amber records memory writes and instruction executions using a single unified mechanism: memory effect maps. A memory effect is simply an event that has an associated memory range and timestamp. The only difference between recording memory writes and instruction executions is that memory write events have associated data, e.g., the values written in memory. Conceptually, then, all that is needed is to send all these events to the indexer process 106. Within a single EBB, a set of memory effects are frequently seen whose ranges are statically known to partition some larger memory range.

For example, the execution of a block of N sequential instructions induces N instruction execution effects whose ranges partition the memory range of the executed block. Byte writes to locations r3, r3−1, and r3−2 are three write effects whose ranges partition the range [r3−2, r3+1). Leverage of this observation occurs by grouping such related effects into "bunches." In general, a bunch is a compound memory effect that has an associated memory range and base timestamp. It also has a list of (timestamp-offset, length) pairs describing how the compound effect can be decomposed into a sequence (not necessarily in timestamp order) of basic memory effects that partition the range. The timestamp of each basic memory effect is obtained by adding its timestamp-offset to the base timestamp.

Figure 7A:
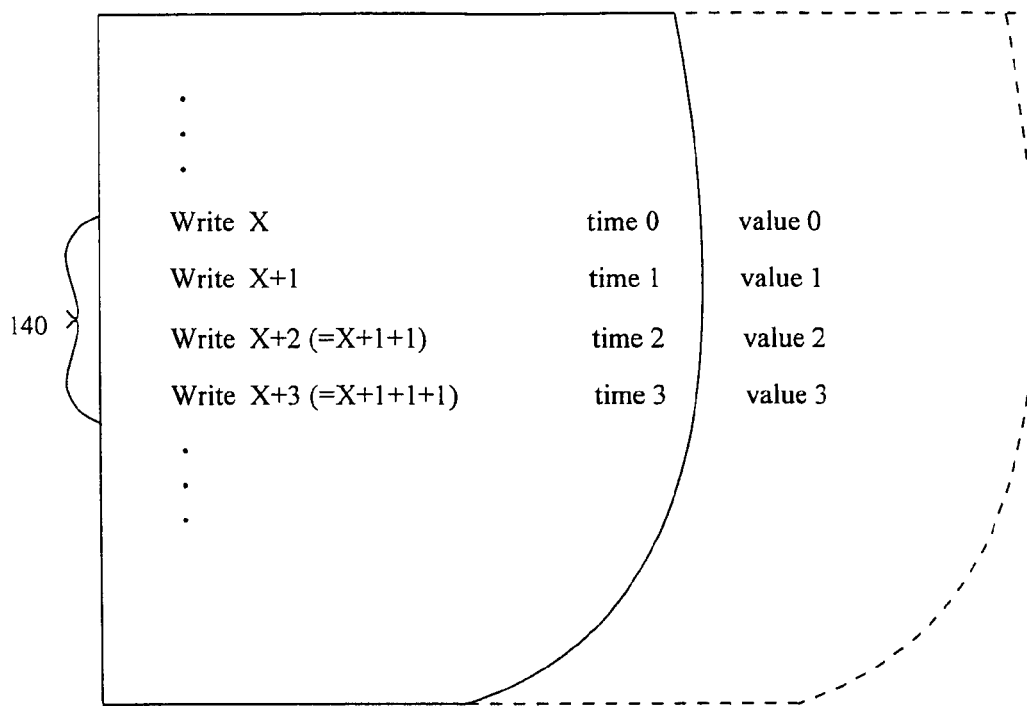
FIGS. 7A and 7B are diagrammatic and flow chart views in accordance with the present invention, respectively, of a second optimization technique for debugging software programs.
Figure 7B:
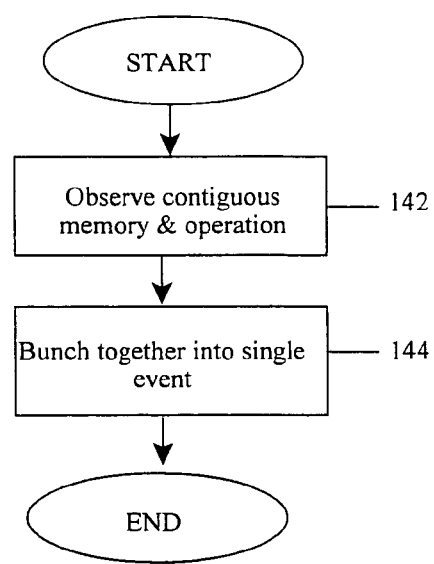

For instance, FIGS. 7A and 7B show an optimization technique from the execution history pertaining to the contiguous locations given as X, X+1, X+2, X+3, etc., each with a corresponding timestamp (time 0, 1, 2, 3, etc.) and/or memory values (value 0, 1, 2, 3, etc.) per each location. A bunching operation can then occur for the entirety of lines 140. Naturally, the order of events need not occur sequentially. That is, a writing of four bytes could occur first at address 100 (X+2), followed by two bytes at address 98 (X), followed by eight bytes at address 99 (X+1) and still the locations could be bunched together. As before, the timestamp of each basic memory effect is obtained by adding its timestamp-offset to the base timestamp. Of course, to the extent a value in the location also exists, it too must be recorded. To the extent any optimization of the value itself can be obtained, although less likely in practice, it too will be implemented. Naturally, the figures illustrate rudimentary examples and the actual implementation is often a bit more rigorous.

One key to the optimization of bunches is that they are formed statically, when an EBB is instrumented. For instruction execution this is fairly trivial: each run of consecutive instructions is one bunch, and instruction addresses are statically known. For memory writes, bunches are formed using a simple heuristic as the IR is scanned from beginning to end: to the extent the current write can be combined into a bunch with a previous write (or previous bunch), then it is undertaken. Write addresses are usually not statically known, however, but in many cases simple dataflow analysis can show that two symbolic address expressions are equal, as before, and facilitates the adding of a write to the beginning or end of a previous bunch. For example, if the current bunch partitions [r3−1, r3+1), then a write to [r3−2, r3−1) is easily seen to form a bunch partitioning the union [r3−2, r3+1). Of course, other implementations are possible and skilled artisans will recognize their precise implementation.

In practice, bunches might also have constraints imposed. Namely, it is preferred to restrict bunches to at most eight component effects, to restrict the length of each component effect to at most 15 bytes, and to restrict the timestamp-offset of each component effect to at most 15. In this manner, it is possible to encode the static decomposition of a bunch into components in just eight bytes.

It is also preferred that single memory effects are encoded as bunches. (As a special case, these singleton bunches can affect up to 255 bytes . . . some x86 SSE2 instructions can write 16 bytes of memory, and some x86 instructions can be longer than 15 bytes.) As a first step, the overall length of the bunch and its decomposition into component effects is determined. Next, the base address is checked to see if it is statically known. If not, it must be emitted by the instrumentation [102] dynamically when the first instruction in the bunch is executed. However, if the dynamic base address is a known static offset from the dynamic base address of the previous bunch of the same type, it is detected and another optimization entered. If so, logging the address of the current bunch can altogether be avoided. This is certainly useful when a single bunch cannot be formed because a "hole" or gap exists in the range of memory affected.

In implementation, all static information about bunches is recorded in the DEFINE_CODE record for the EBB. Residual dynamic information is emitted in the EXEC record each time the EBB is executed. For memory writes, the written value is always emitted dynamically by the instrumentation around the write instruction. As anticipated, static bunch detection significantly reduces the number of memory events that must be handled by each stage of Amber, resulting in a major gain in efficiency.

Turning to the details of the indexer process 106, FIG. 4, the Valgrind/Amber process 102 spawns or generates the indexing and compression engine as a separate process. As a result, the indexer process can use standard C libraries. (Valgrind tools, on the other hand, cannot use standard libraries because they are instrumented.) It also limits the impact of Amber on the address space layout seen by the program being debugged. It further allows the indexer to detect and recover from unexpected failure in the Valgrind process. While an architecture putting the indexing and compression engine directly into the Valgrind process and allowing direct calls from Amber instrumentation into the indexing and compression engine might have more efficiencies, the present implementation has advantage because the indexing and compression can exist in separate threads or processes allowing that work to be performed by another CPU core. (Putting the indexer in a different thread of the same process would lose the advantages of separate processes for no gain.)

To maximize write bandwidth, the indexer process prefers to always append to the end of the database file, never seeking within it or writing to another file. Memory map changes, recorded by SET_ADDR_MAP records, are accumulated into a single array along with their timestamps and written out in one chunk at the end of the run. Beyond that, the indexer process 106 outputs 107 three main kinds of data to the database: 1) the static information about EBBs as sent by the instrumentation 102; 2) lists of EBBs executed plus dynamic register data (all compressed); and 3) indexed and compressed memory effects. The volume of static EBB data is negligible compared to the rest of the data, so its storage format is not important as long as lookup by EBB ID is efficient.

Hereafter, the output 107, FIG. 4 of the indexer process 106 is stored, such as in a database, according to the log step 122, FIG. 5. What the stored information looks like, or how it is arranged, for later query and easy diagnosis of problems in the debuggee program, is described next. Among other things, the execution history is divided into discrete sections known as "epochs."

Figure 8A:
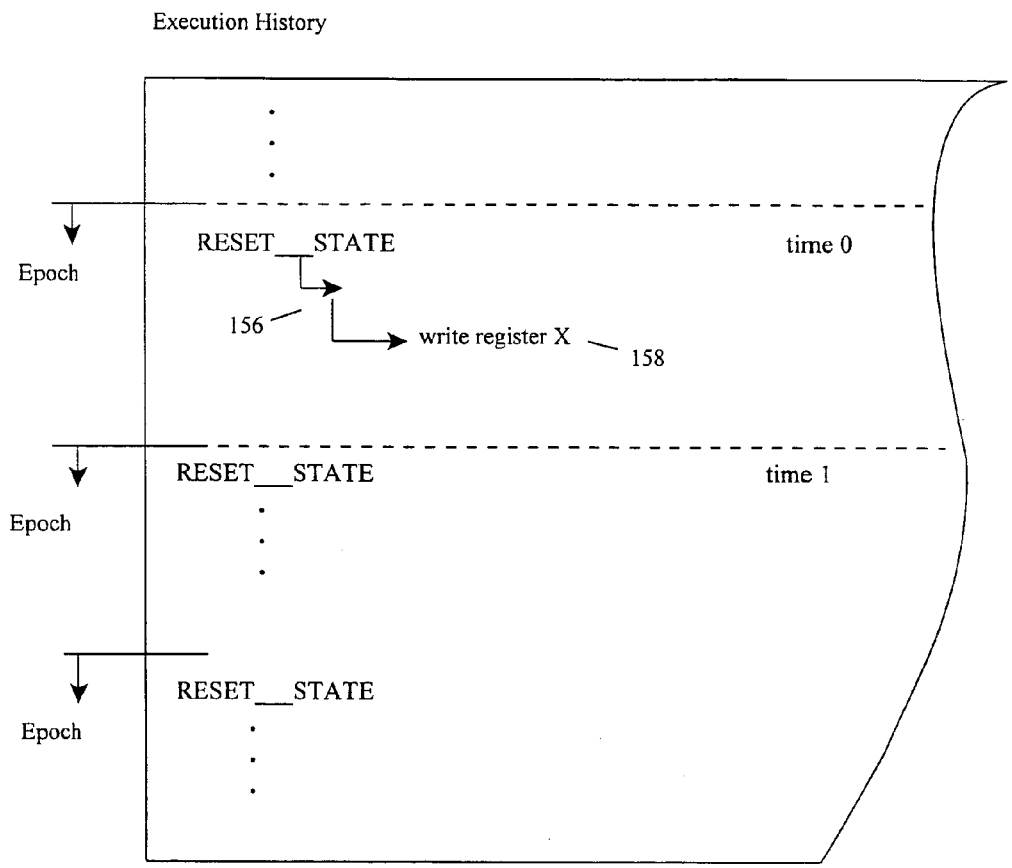
FIGS. 8A and 8B are diagrammatic and flow chart views in accordance with the present invention, respectively, of a third optimization technique for debugging software programs.
Figure 8B:
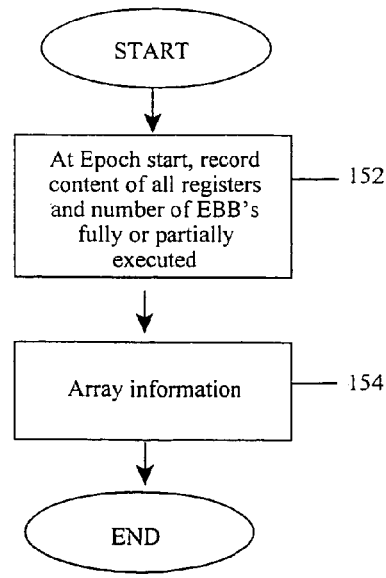

With reference to FIGS. 8A and 8B, the execution history 150 has one or more epochs, each beginning upon the next occurrence of the RESET_STATE record. In array form, a list of all epochs is appended to the database, wherein each array entry contains the timestamp of the epoch start (time 0, time 1, time 2, etc., whereby time 0, time 1 and 2, are exceptional spaced apart times, perhaps corresponding to the number of instructions executed, such that time 0, time 1, and time 2 are not sequential, but illustrative of three times spaced as time 0, time 1,000,000, time 2,000,000, etc.), the thread ID of the epoch 156, a bitmask indicating which registers were written during the epoch 158, and the file offset of the compressed epoch details. The bitmask and thread ID allow reasonably efficient searches to determine which epochs belong to a given thread or which epoch contains a write to given register(s) by a given thread.

At the start of the details, the contents of all registers are recorded at the start of the epoch, and the number of EBBs executed (or partially executed), step 152. Then follows an array step 154, with the number of instructions executed by each EBB (only one byte required per EBB execution), followed by another array with the ID of each executed EBB. (The arrays are separated to avoid wasted space due to alignment constraints, and also to make determining which EBB execution contains a given instruction timestamp as fast as possible.) After those arrays, the raw register log data for all EBB executions follows, as described above. The complete register log data is then stored even for EBBs that exited early; unused log entries will have been zeroed out by the instrumentation as described above.

Intuitively, one key to achieving a high compression ratio of the recorded information is to ensure that repetitious code in the instrumented program produces repetitious input to the compressor. For instance, it is common for an instruction at address X, that writes a register R, to write the same value each time it is executed. However, it is also common for the values written to R to form an arithmetic progression (e.g. as a counter increments or as a pointer strides through memory), and these values are not compressed well by a simple compressor such as zlib. Therefore, our domain knowledge is exploited to improve the compression by preprocessing the data. For example, when copying register log data for an EBB execution to the details buffer for compression, if this is not the first execution of the EBB in this epoch, the difference between the log data for this execution and the log data for the previous execution of the same EBB is what becomes stored. To simplify the code and increase speed, the structure of the log data is ignored and word-by-word differencing of the memory blocks is performed. With this optimization, repeated executions of instruction X that write the same values to register R produce zeroes as input to the compressor, and when the values form an arithmetic progression with stride C, the input to the compressor is very likely to be a string of Cs (interspersed with other values from other instructions).

Figure 6A:
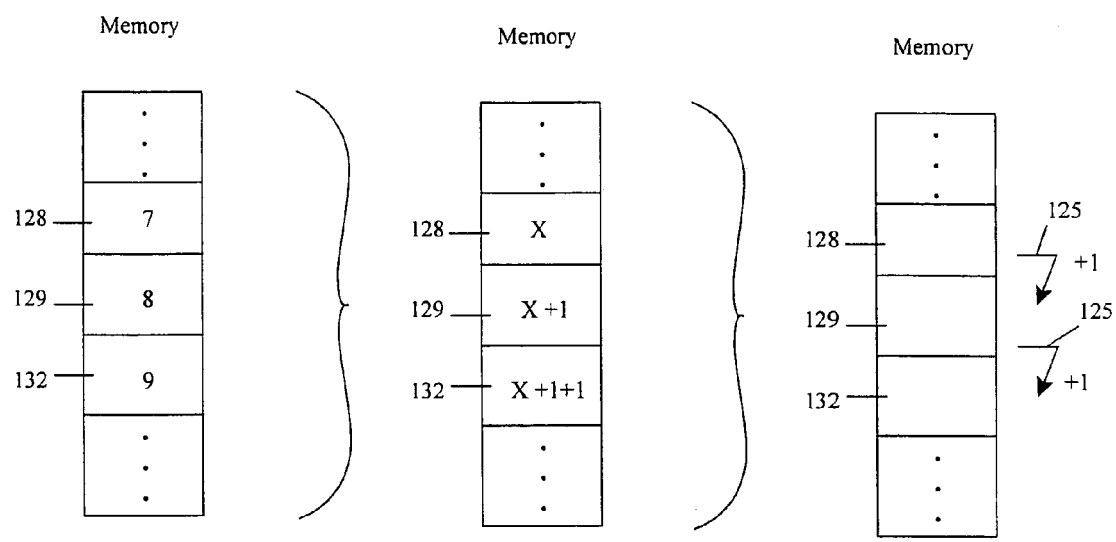
FIGS. 6A and 6B are diagrammatic and flow chart views in accordance with the present invention, respectively, of a first optimization technique for debugging software programs.
Figure 6B:
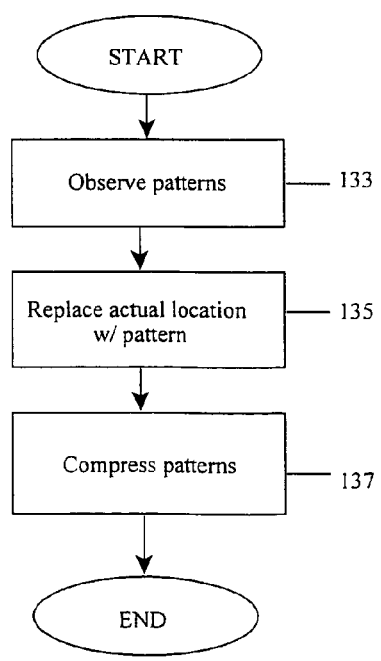

For instance, FIGS. 6A and 6B show a series of grouped or contiguous memory locations, 128, 129, 132 labeled as actual locations 7, 8 and 9, respectively. Rewriting this, the locations are also seen mathematically as X, X+1, and X+2 (or X+1+1). In turn, it is observed that the pattern between locations is an uptick 125 of +1 between all the locations. In terms of compression, it is then easier to observe a pattern of uptick +1, step 133, replace the actual location with the pattern, step 135, and compress the pattern, step 137, instead of actually compressing (and storing) the memory locations 7, 8 and 9. In other words, a redundancy of +1 in the locations is observed that is translated into an optimization for compression.

Altogether, the debugging process undertakes computing the value of any given register(s) at a given timestamp which requires locating the epoch containing the timestamp in the epoch array (binary search can be used), reading the compressed epoch data block from disk and decompressing it, initializing register values to the initial values and then replaying the register operations of the EBBs executed before the given timestamp. The instrumentation engine bounds the number of EBB executions between RESET_STATE events, i.e., between epochs, so the cost of reconstructing registers is generally a single disk seek and some bounded amount of CPU processing time.

Figure 9:
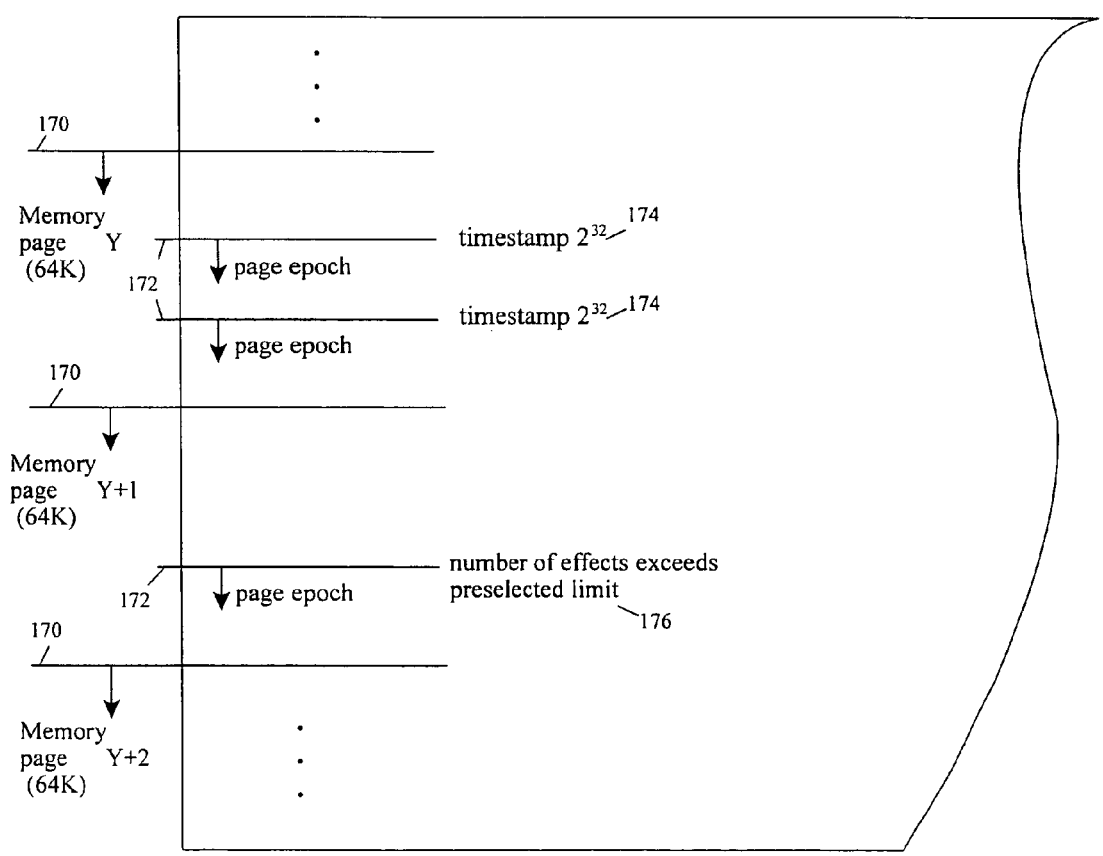
FIG. 9 is a diagrammatic view in accordance with the present invention of a fourth optimization technique for debugging software programs.

For memory effects that are indexed, it is preferred they be stored per memory "page." In Amber, page size need not correspond to the system page size; currently 64K is used as the size of a page 170 as seen in FIG. 9. In turn, each memory page is divided into discrete history sections called "page epochs" 172. For this, a new page epoch begins when the current timestamp is at least $2^{32}$ instruction executions after the start of the current epoch [174], or when the number of effects in the current epoch exceeds some preselected limit 176, currently set at 60,000 which was chosen to make the compressed data for each page epoch be on the order of 100 KB.

Figure 10:
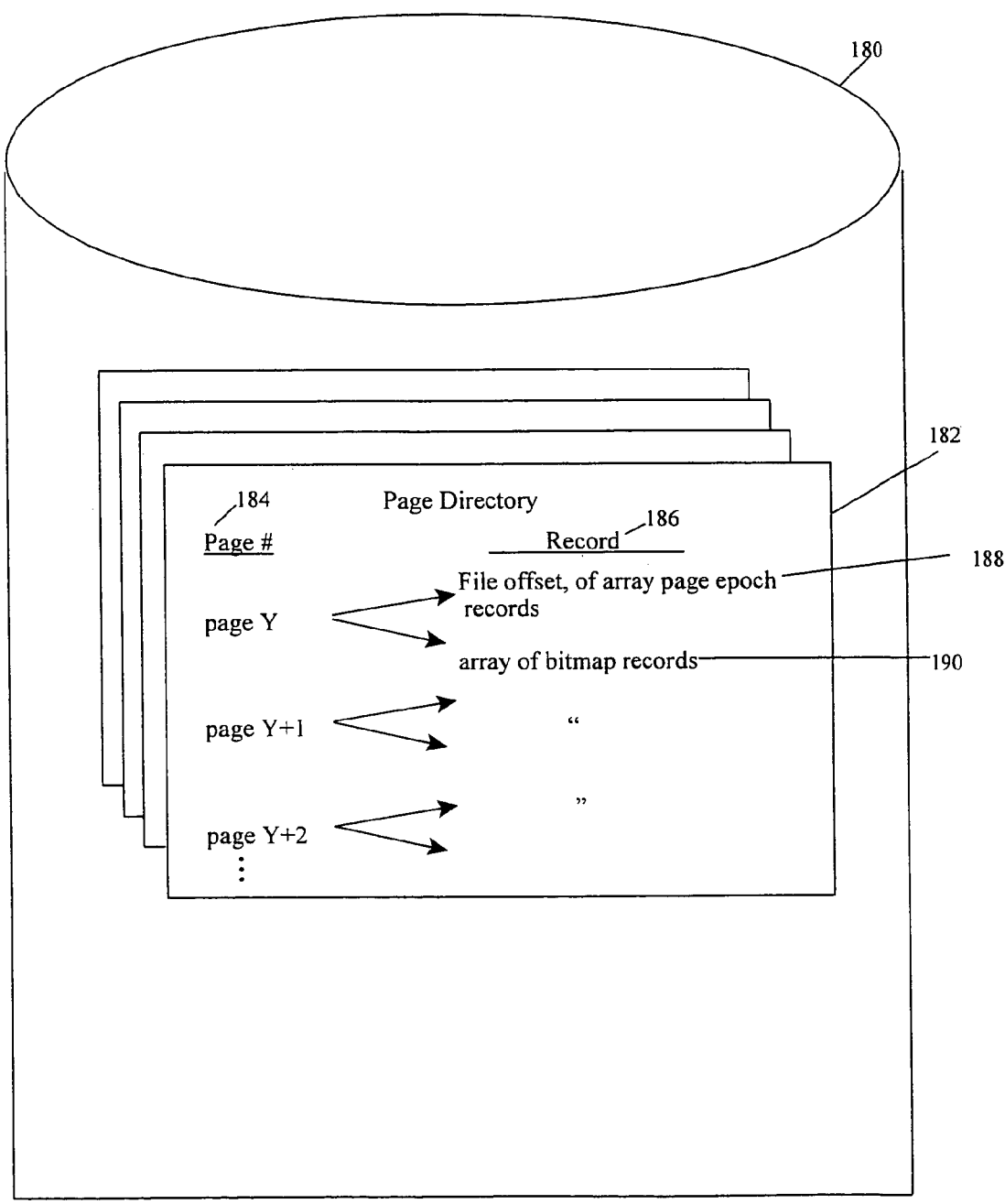
FIG. 10 is a diagrammatic view in accordance with the present invention of a database that is queried in order to ascertain and fix bugs in software programs.

The database 180, FIG. 10 contains (among other things) a page directory 182, organized as a hash table mapping page numbers 184 (the page address divided by the page size) to page records 186. In turn, each page record contains the file offsets 188 of an uncompressed array of page epoch records and an uncompressed array of bitmap records 190.

In further turn, each bitmap record contains the offset and length of compressed data for N (currently eight) bitmaps, each showing which memory locations were affected during a particular page epoch. (For example, the instruction execution effects bitmap for a page epoch indicates which instructions were executed in the page during the epoch.) The bitmaps for each page epoch are compressed using run-length encoding before being aggregated and sent to the general compressor. (In practice the run-length encoding is extremely effective, which is why the results from multiple epochs are aggregated before doing a relatively expensive compress-and-write.) The query engine 108, FIG. 4 searches these bitmaps to determine which page epochs affect particular memory locations, especially to determine which page epoch was the last epoch to affect a particular location before some designated timestamp. Also, it can actually perform this analysis directly using the run-length encoded form of the bitmap.

Figure 11:
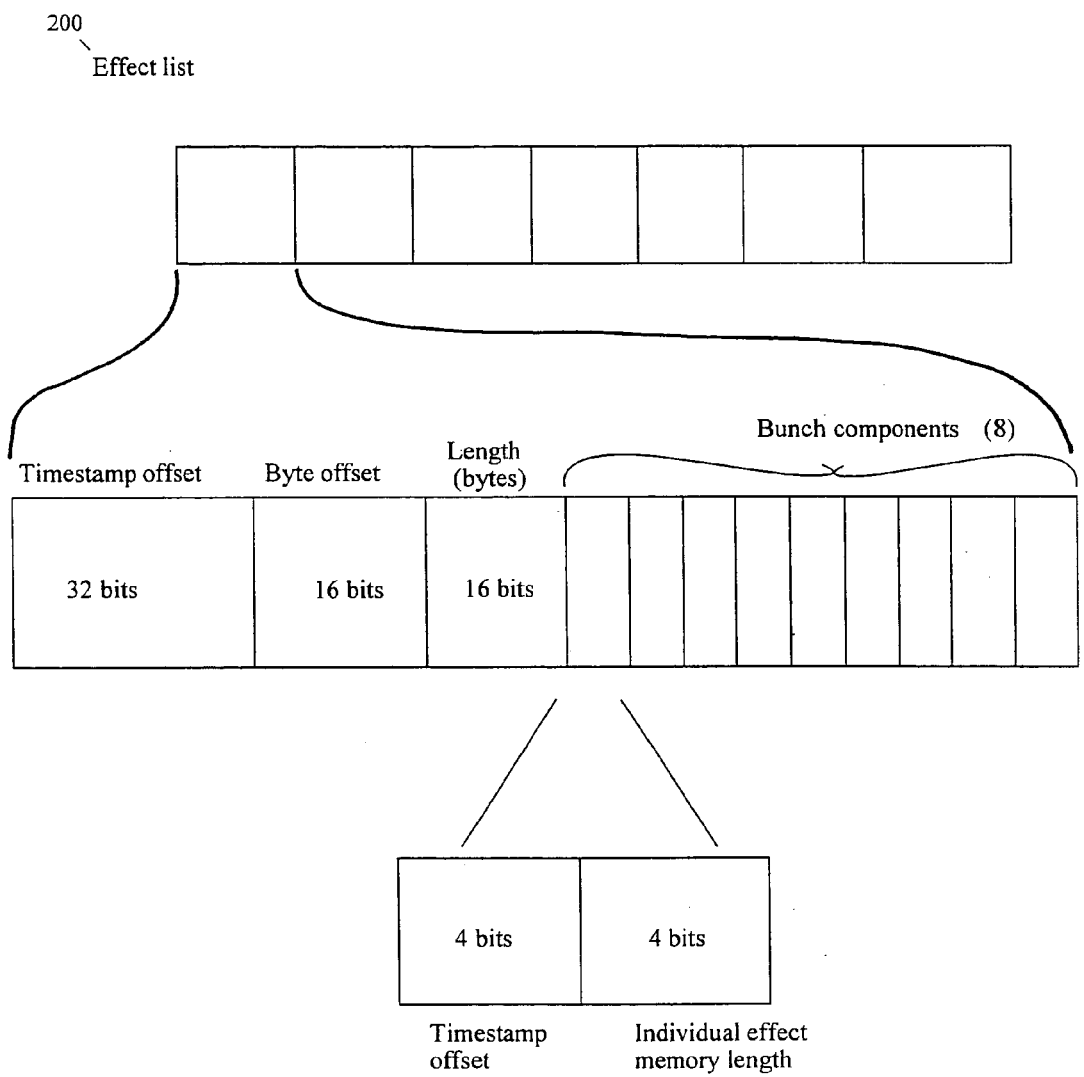
FIG. 11 is a diagrammatic view in accordance with the present invention of a parsed effect list.

The page epoch record, on the other hand, contains the timestamps of the first and last effect in the epoch. It also contains the file offset and length of a compressed list of all effects in the epoch. Each effect in the list 200 (FIG. 11) records the timestamp of the effect relative to the start of the epoch (stored in 32 bits; this cannot overflow because it is restricted the epoch duration), the 16-bit address within the page of the affected memory, and the 16-bit length (with zero interpreted as $2^{16}$ bytes). The effects are actually bunches, so the eight-byte bunch descriptor is also stored to indicate how the bunched effect breaks down into individual effects.

As before, the principle that repetitious program behavior should produce repetitious input to the compressor is applied. Thus, loops that repeatedly write into a page with constant address strides are common, and timestamps of each write also often form an arithmetic progression (because the number of instructions executed per iteration is often constant). Therefore, for each effect the difference in timestamp and address between the effect and the previous effect is that which is actually stored.

Appreciating it is often desirable to traverse the effects during diagnosis in reverse-time order, the page epoch record also includes the timestamp and absolute address offset of the last effect. The reconstruct effects can then be seen in reverse order by subtracting the differences instead of adding them.

For effect types that have associated data values (e.g., memory writes), the values for each effect are appended to the effect list before compression. During use, when the indexer process 106 receives an EXEC record from the instrumentation 102, it extracts the effects from the static EBB descriptor, merges them with the dynamic data to compute the final address of each effect, and appends each effect to the current page epoch for the affected memory page and effect type. An effect may span multiple pages (x86 permits unaligned accesses), so a slow path breaks up such effects into multiple effects (a nontrivial task when bunches must be decomposed). When an EBB exits early, it is preferred to take another slow path that determines which effects actually happened and then applies them (again, nontrivial when some of the effects in a bunch were not executed). Fortunately these slow paths are rarely required. On the other hand, bunched effects almost always pass through the indexer process without requiring decomposition, which is why they result in large performance wins.

Memory writes not performed by program code, including user-space writes by the kernel and memory "writes" performed by address space changes, are received as BULK_WRITE records by the indexer process, which turns them into one memory write effect to each affected page.

As imaginable, the indexer process can consume large amounts of memory as it stores partially-completed page epoch data for each active page. This overhead, however, is roughly a constant times the debuggee's memory usage; the constant can be tuned to trade off indexer processor memory usage against page epoch size (larger page epochs require more interim storage but compress better and reduce CPU overhead).

For the querying of the Amber database 180 to obtain user results to diagnose bugs, the query engine 108, FIG. 4 is quite simple. In one embodiment, it receives JSON-formatted queries over a socket and send replies over the same socket. Queries are stateless and the query engine never writes to the database, so it is easy to run queries in parallel. Almost the entire design of the engine is determined by the database structure described above. In fact, one of the hardest problems encountered by the inventor in design of the query engine was designing a query API to expose compiler-generated debug information to the debugger, and implementing that API for DWARF2. (Working with DWARF2 directly from a high-level language is undesirable since parsing debug information is often a performance problem in debugging sessions, and low-level memory manipulation is helpful. Also, if Amber is to be used for remote debugging 97, it is helpful to avoid sending large program binaries over the connection 13.)

In that it has already been described how to reconstruct register state effects for any time T, the reconstruction of the memory write effect data for any time T is described. First the memory area required is divided into pages. For each page, the summary bitmaps are used to determine which page epochs up to time T wrote to the memory locations of interest. (For the page epoch containing T, the bitmap tells us which locations may have been written before T; for earlier page epochs, the bitmap tells which locations were definitely written before T.) Then the effect list is fetched for each relevant page epoch and traversed backwards to find the last write to each location of interest. (These steps can be undertaken in parallel.) Also, the address space map events are checked in case the last change to the contents of the memory was a memory map change. Note that this approach to memory reconstruction also reveals when the last write to each location occurred.

While this approach may require a large number of page epochs to be considered, and a large number of effects to be scanned in each page epoch, it all could be avoided by saving the compressed contents of the page at the start of each page epoch, at the cost of a considerable increase in bandwidth. So far, however, it appears this is not necessary; the debugger generally only reconstructs small amounts of data from any given page, or when it requires large amounts of data, the writes to store the data have temporal locality. More experience to evaluate this approach, however, will certainly be required with future work.

Overall, a design goal of the invention was to squeeze or fit the entire Amber database 180 into less than one byte per instruction executed, for realistic applications. In prototype, this has been achieved. With a Firefox web browser debug build running on a 32-bit x86 laptop, a test run that started up the browser, displayed a Web page and shut down executed more than 4.8 billion instructions, the resulting database size was only 3870 MB. In turn, the number of bytes per instruction turned out to be about 0.838. The entire run took about twenty minutes (about 300 times slower than a regular execution). While this is fairly slow, it is easy to automate these runs so no human attention is required, thereby making the process better.

Ultimately, skilled artisans will appreciate that, with careful design in accordance with teachings herein, it is not difficult to meet the goals set out in the background. Complete recording (with indexing) can be carried out on commodity desktop hardware with reasonable efficiency. It can also occur in any language, other than representative C and C++ programs, provided a mapping exists from process state to language-level state. Also, interpreted languages can be debugged, since the state of the interpreter can be reconstructed. For the future, an obvious direction is to record allocation and deallocation as memory effects, so the debugger can know the allocation state of all memory at all times, and efficiently determine when a particular memory location was allocated or freed. C++ construction and destruction could be recorded the same way thereby making known the type of many memory locations. This would assist regular debugging and make it even easier to find certain kinds of memory errors.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing environment, a method of debugging a software program regardless of a size of the software program, comprising:
obtaining a debuggee program;
without user input, determining all memory and register writes in the debuggee program regardless of when each said memory or register write occurred;
indexing the all memory and register writes;
compressing the indexed all memory and register writes so that upon later decompression the user can diagnose defects in the debuggee program; and
dividing an execution history of executable instructions of the debuggee program into discrete sections before the compressing, the discrete sections being arrayed together non-sequentially according to a number of instructions executed in the debuggee program wherein, at a beginning of each said discrete section, a content of all registers is recorded.

2. The method of claim 1, further including recording all instructions executed in the debuggee program before the determining all memory and register writes.

3. The method of claim 1, wherein the compressing further includes observing patterns in contiguous memory locations and replacing the memory locations with the observed pattern, the compressing including compression of the pattern.

4. The method of claim 1, further including querying the compressed index of all memory and register writes.

5. The method of claim 4, further including displaying a time-ordered result of the querying including displaying the all memory and register writes regardless of when each said write occurred.

6. A computer program product on a computer readable media having computer-executable instructions for performing the determining, indexing and compressing steps recited in claim 1.

7. The method of claim 1, further including bunching together contiguous memory locations before the compressing.

8. In a computing environment, an architecture on a first computing device for debugging a software program on said first computing device or another computing device in communication with the first computing device regardless of a size of the software program, the architecture comprising:
an instrumentation engine to cull all memory and register writes from the software program, without user input, regardless of when each of said memory or register write occurred;
an indexer process to receive and order an arrangement of the culled all memory and register writes from the instrumentation engine for compression into a log, said indexer process including a component to divide an execution history of the software program into discrete sections before compressing, the discrete sections being arrayed together non-sequentially according to a number of instructions executed in the software program; and
a query engine in communication with the log to obtain a decompressed version of the culled all memory and register writes so the user can diagnose defects in the software program.

9. The architecture of claim 8, further including another software program for interfacing with the instrumentation engine to cull the all memory and register writes from the software program.

10. The architecture of claim 8, wherein the indexer process further includes another component to examine contiguous memory locations written to by the software program and replace the memory locations with a pattern that becomes compressed.

11. The architecture of claim 8, wherein the component for dividing the execution history of the software program into discrete sections records a content of all registers at a beginning of each said discrete section.

12. The architecture of claim 8, wherein the indexer process further includes another component to bunch together contiguous memory locations before the compressing, the another component is configured to replace multiple same memory effects in the contiguous locations with a single memory effect representing said multiple same memory effects.

13. In a computing environment, an architecture on a first computing device for debugging a software program on said first computing device or another computing device in communication with the first computing device regardless of a size of the software program, the architecture comprising:
an instrumentation engine to cull all memory and register writes from the software program, without user input, regardless of when each of said memory or register write occurred, further including an interface with another software program useful in debugging the software program;
an indexer process to receive and order arrangement of the culled all memory and register writes from the instrumentation engine for compression into a log, the indexer process including: a first component to examine contiguous memory locations written to by the software program and replace the memory locations with a pattern that becomes compressed, a second component to divide an execution history of the software program into discrete sections that are arrayed together non-consecutively before compression, and a third component to bunch together contiguous memory locations before the compressing; and
a query engine in communication with the log to obtain a decompressed version of the culled all memory and register writes so the user can diagnose defects in the software program at a time after the query.

14. In a computing environment, a method of debugging a software program regardless of a size of the software program, comprising:
obtaining a debuggee program;
recording all instructions executed in the debuggee program;
thereafter, without user input, determining all memory and register writes in the debuggee program regardless of when each said memory or register write occurred;

indexing the all memory and register writes, including dividing the instructions executed into discrete sections that are arrayed together non-consecutively and bunching together contiguous memory locations;

compressing the indexed all memory and register writes including compressing the bunches of contiguous memory locations written to by the debuggee program;

querying the compressed index;

decompressing the compressed index; and causing display of the decompressed compressed index so that the user can diagnose defects in the debuggee program, including displaying a time-ordered result of the all memory and register writes.

15. A computer program product on a computer readable media having computer-executable instructions for installation on a computing device for debugging a software program on or in communication with the computing device, comprising:

a first component to cull all memory and register writes from the software program, without user input, regardless of when each of said memory or register writes occurred;

a second component to receive and compress the culled all memory and register writes from the first component;

a third component in communication with the second component to obtain a decompressed version of the compressed culled all memory and register writes; and a fourth component to cause display of the decompressed version on a monitor of the computing device so the user can diagnose defects in the software program, wherein the second component is further configured to divide an execution history of the software program into discrete sections that are arrayed together non-sequentially before the compressing.

16. The computer program product of claim 15, further including a fifth component for interacting with another software program useful in debugging the software program in order to cull the all memory and register writes.

17. The computer program product of claim 15, wherein one of the components further includes an ability to examine contiguous memory locations written to by the software program and replace the contiguous memory locations with a single pattern that becomes compressed by the second component as part of the culled all memory and register writes.

18. The computer program product of claim 15, wherein one of the components further includes a bunching function for contiguous memory locations before the compressing.

* * * * *